US008362100B2

(12) United States Patent
Ohno et al.

(10) Patent No.: US 8,362,100 B2
(45) Date of Patent: Jan. 29, 2013

(54) INK CURABLE WITH ACTINIC ENERGY RAY AND PRINTED MATTER

(75) Inventors: Akiko Ohno, Elk Grove Village, IL (US); Kazuya Inoue, Tokyo (JP); Satoshi Maeda, Tokyo (JP); Toshifumi Midorikawa, Tokyo (JP)

(73) Assignee: Tokyo Ink Mfg. Co., Ltd., Tokyo (JP)

( * ) Notice: Subject to any disclaimer, the term of this patent is extended or adjusted under 35 U.S.C. 154(b) by 356 days.

(21) Appl. No.: 12/668,002

(22) PCT Filed: May 28, 2008

(86) PCT No.: PCT/JP2008/059797
§ 371 (c)(1),
(2), (4) Date: Jan. 6, 2010

(87) PCT Pub. No.: WO2009/008226
PCT Pub. Date: Jan. 15, 2009

(65) Prior Publication Data
US 2010/0304098 A1    Dec. 2, 2010

(30) Foreign Application Priority Data

Jul. 6, 2007   (JP) ................................. 2007-178738
Aug. 3, 2007   (JP) ................................. 2007-202557
Aug. 3, 2007   (JP) ................................. 2007-202558

(51) Int. Cl.
*C09D 11/10* (2006.01)
*B32B 27/26* (2006.01)
(52) U.S. Cl. ........................ 522/14; 428/195.1; 427/511
(58) Field of Classification Search .................. 522/8, 9, 522/10, 14; 428/195.1; 427/511
See application file for complete search history.

(56) References Cited

U.S. PATENT DOCUMENTS 7,932,300 B2 *   4/2011  Naruse et al. .................... 522/8
2005/0197420 A1 *   9/2005  Santobianco et al. ........ 522/176

FOREIGN PATENT DOCUMENTS

| EP | 1671806 A2 | 6/2006 |
| JP | 6-157962 | 6/1994 |
| JP | 07-033810 | 2/1995 |
| JP | 2001-335728 | 12/2001 |
| JP | 2006-016510 | 1/2006 |
| JP | 2006-335924 | 12/2006 |
| JP | 2007-023151 | 2/2007 |
| JP | 2007-023256 | 2/2007 |
| JP | 2007-056187 | 3/2007 |
| WO | WO-2007/045579 A1 | 4/2007 |

OTHER PUBLICATIONS

Machine translation of JP 2007-056187 (Mar. 8, 2007).*
European Search Report issued in European Patent Application No. 08764813.5 dated Mar. 8, 2012.

* cited by examiner

*Primary Examiner* — Vu A Nguyen
(74) *Attorney, Agent, or Firm* — McDermott Will & Emery LLP

(57) ABSTRACT

An ink curable with actinic energy rays characterized by containing a photocleavage type photopolymerization initiator (A) comprising α-aminoalkylphenone compound (A1) having a molar absorption coefficient measured at a wavelength of 363 nm of 100 (l/mol·cm) or more and less than 100,000 (l/mol·cm) and/or an acylphosphine oxide compound (A2) having a molar absorption coefficient measured at a wavelength of 365 nm of 100 (l/mol·cm) or more and less than 100,000 (l/mol·cm); and a hydrogen abstraction type photopolymerization initiator (B) comprising 4,4'-dialkylaminobenzophenone having a molar absorption coefficient at a wavelength of 365 nm of 10,000 (l/mol·cm) or more and less than 1,000,000 (l/mol·cm) and by optionally containing a tertiary amine compound (C) having a molar extinction coefficient as measured at a wavelength of 365 nm of 1 (l/mol·cm) or lower. The ink further includes a resin, a pigment, and a compound having an acrylate group.

20 Claims, No Drawings

INK CURABLE WITH ACTINIC ENERGY RAY AND PRINTED MATTER

RELATED APPLICATIONS

This application is the U.S. National Phase under 35 U.S.C. §371 of International Application No. PCT/JP2008/059797, filed on May 28, 2008, which in turn claims the benefit of Japanese Application Nos. 2007-178738, filed on Jul. 6, 2007, 2007-202557, filed on Aug. 3, 2007 and 2007-202558, filed on Aug. 3, 2007, the disclosures of which Applications are incorporated by reference herein.

TECHNICAL FIELD

The present invention relates to an active energy ray-curable ink, a method for producing a cured matter of the active energy ray-curable ink, and a printed matter. Further, the invention relates to as well an ink such as a transparent overprint varnish (commonly known as OP varnish) that is further printed by a printing machine after monochrome or multicolor printing, and a multicolor set of color printing inks such as a yellow ink, a magenta ink, a cyan ink and a black ink. In more detail, the invention relates to an active energy ray-curable ink particularly suitable for curing with a light-emitting diode emitting UV-rays having an emission peak wavelength in the range of 350 to 420 nm (hereinafter, referred to as "UV-LED"), a multicolor set made of the inks, a method for producing a cured matter of ink, and a printed matter.

BACKGROUND ART

In order to obtain various printed matters such as printed matters for use in office form, printed matters for various kinds of books, printed matters for various kinds of wrappings such as carton paper, various kinds of plastic printed matters, printed matters for use in seal or label, art printed matters, and metal printed matters (art printed matters, printed matters for use in a can for drinking, and printed matters for use in food such as canned food), various kinds of printing methods such as a lithographic printing method (standard lithographic printing method that uses dampening water and water-less lithographic printing method that does not use dampening water), a letterpress printing method, an intaglio printing method, and a stencil printing method have been adopted, and inks suitable for the respective printing methods have been used to print. As one of such inks, an active energy ray-curable ink is known. An existing active energy ray-curable ink is cured by use of a light source such as a mercury lamp or a metal halide lamp, and a photopolymerization initiator matched to an emission wavelength used to cure the ink is used. UV-ray irradiation light sources mentioned above have an emission region over a wide wavelength region; accordingly, several kinds of photopolymerization initiators having different absorption wavelengths (see, patent document 1) are used in combination in existing active energy ray-curable inks corresponding to a color of ink or a kind of a light source used to cure. Thus, existing active energy ray-curable inks can respond to curing of an ink with a mercury lamp, a metal halide lamp or the like because it uses photopolymerization initiators having different absorption wavelengths. However, when an ink is cured with a monochromatic light source such as a UV-LED, the ink cannot be sufficiently cured. Furthermore, when the existing active energy ray-curable inks are cured with UV-LED, a photopolymerization initiator having an absorption in a wavelength from 350 to 420 nm has to be used. However, pigments used in inks have, though different in magnitude of absorption thereof, light absorption in a wavelength from 350 to 420 nm in many cases. Accordingly, even if a photopolymerization initiator having absorption in a wavelength from 350 to 420 nm is used as a photopolymerization initiator of an ink, the ink cannot be sufficiently cured. In particular, a black ink and a cyan ink has a large light absorption in the vicinity of a wavelength of 365 nm compared with a yellow ink and a magenta ink; accordingly, even if a photopolymerization initiator having absorption in a wavelength from 350 to 420 nm is used, curability thereof is poor since sufficient light energy cannot be imparted to the photopolymerization initiator. Usually, a multicolor overprinting with a black ink, a cyan ink, a magenta ink and a yellow ink is carried out in this order in process-printing. However, as a film thickness of inks becomes higher in a portion where color density is deep or color inks are overprinted, light transmittance decreases towards a depth direction. As a result, curability in the ink deteriorates. In particular, since the black ink and the cyan ink are cured by light passed through portions of the yellow ink and the magenta ink in a four-color overprinted portion, the internal curability is remarkably deteriorated. In this connection, as a method for imparting curability by an UV-LED, an ink composition using a triazine initiator has been proposed (see, patent document 2).

Patent document 1: Japanese Patent Laid-Open (JP-A) No. 6-157962

Patent document 2: JP-A No. 2007-23151

DISCLOSURE OF THE INVENTION

Problems to be Solved by the Invention

However, there has not been necessarily obtained an ink having a curing property to active energy rays, that can sufficiently satisfy all of various printing modes, in particular, to a UV-LED which emits UV-ray having an emission peak wavelength in the range of 350 to 420 nm even by a triazine initiator.

Accordingly, an object of the present invention is to provide an active energy ray-curable ink that has curability for active energy rays, in particular, is designed for UV-rays generated by a UV-LED as a curing wavelength, has excellent photopolymerizability and photo-curability by UV-rays irradiated from a UV-LED which generates UV-rays having a peak wavelength in the range of 350 to 420 nm, has a very excellent curing property when used in various printing methods as mentioned above including an offset printing method, and is excellent also in characteristics such as printing aptitude and storage stability.

Further, another object of the invention is to provide a multicolor set comprising active energy ray-curable inks excellent in the above-mentioned characteristics, a method for producing a cured matter of the ink, and a printed matter.

Means for Solving the Problems

The present inventors found that when, as a photopolymerization initiator, a photocleavage type polymerization initiator having a molar absorption coefficient (l/mol·cm) as measured at 365 nm of 100 (l/mol·cm) or more, preferably a photocleavage type polymerization initiator (A) comprising an α-aminoalkylphenone compound (A1) having a molar absorption coefficient as measured at a wavelength of 365 nm of 100 (l/mol·cm) or more and less than 100,000 (l/mol·cm) and/or an acylphosphine oxide compound (A2) having a molar absorption coefficient as measured at a wavelength of 365 nm of 100 (l/mol·cm) or more and less than 100,000 (l/mol·cm); a hydrogen abstraction type polymerization initiator comprising 4,4'-dialkylaminobenzophenone having a molar absorption coefficient as measured at a wavelength of 365 nm of 10,000 (l/mol·cm) or more, preferably a molar absorption coefficient as measured at a wavelength of 365 nm of 10,000 (l/mol·cm) or more and less than 1,000,000 (l/mol·cm); and, as required, a tertiary amine compound having a molar absorption coefficient as measured at a wavelength of 365 nm of 1 (l/mol·cm) or less are used in combination, an active energy ray-curable ink having excellent photopolymerizability and internal curability to UV-ray of 365 nm is obtained, and, when the ink is used, a printed matter having excellent curability also in a portion where color inks are overprinted can be obtained.

The inventors further found that when a multicolor set of active energy ray-curable inks, in which a weight concentration of a photopolymerization initiator for active energy ray with a molar absorption coefficient as measured at 365 nm of 10,000 (l/mol·cm) or more and less than 1,000,000 (l/mol·cm), which is contained in an ink existing in a closest side to an active energy ray irradiation source when multicolor printing is performed, is in the range of 0% to 80% relative to a weight concentration of a photopolymerization initiator for active energy ray with a molar absorption coefficient as measured at 365 nm of 10,000 or more and less than 1,000,000 (l/mol·cm), which is contained in an ink on a farthest side from an active energy ray irradiation source, is used, an active energy ray-curable ink having excellent photopolymerizability to UV-rays around 365 nm and internal curability in a multicolor overprinted portion of color inks can be obtained.

Furthermore, black, cyan, magenta and yellow inks are multicolor overprinted in this order in a process-printing. Accordingly, it was found that, when a multicolor set where a weight concentration of a photopolymerization initiator for active energy ray, which is contained in a yellow ink and has a molar absorption coefficient of 10,000 or more and less than 1,000,000 (l/mol·cm), is in the range of 0% to 80% relative to a weight concentration of a photopolymerization initiator for active energy ray, which is contained in a black ink and a cyan ink and has a molar absorption coefficient as measured at 365 nm of 10,000 or more and less than 1,000,000 (l/mol·cm), is used and multicolor printing is performed using these inks, energy of light can be sufficiently imparted even to a black color portion; accordingly, excellent curability can be obtained in a multicolor overprinted portion.

Furthermore, it is found that in yellow and magenta inks used in a multicolor set of an active energy ray-curable ink, when the relative intensity of absorbance A as measured at a wavelength 365 nm to absorbance B as measured at a wavelength 430 nm, where these wavelengths are wavelengths of an absorption spectrum in a pigment solution, is specified, a printed matter excellent in the curability can be obtained even in the overprinting.

The invention is achieved based on these findings.

That is, the invention relates to an active energy ray-curable ink, a multicolor set comprising the active energy ray-curable inks, a method for producing a cured matter of ink, and a printed matter described below.

(1) An active energy ray-curable ink comprising a photocleavage type photopolymerization initiator (A) comprising an α-aminoalkylphenone compound (A1) having a molar absorption coefficient as measured at a wavelength of 365 nm of 100 (l/mol·cm) or more and less than 100,000 (l/mol·cm) and/or an acylphosphine oxide compound (A2) having a molar absorption coefficient as measured at a wavelength of 365 nm of 100 (l/mol·cm) or more and less than 100,000 (l/mol·cm); and a hydrogen abstraction type photopolymerization initiator (B) comprising 4,4'-dialkylaminobenzophenone having a molar absorption coefficient as measured at a wavelength of 365 nm of 10,000 (l/mol·cm) or more and less than 1,000,000 (l/mol·cm).

(2) The active energy ray-curable ink described in the item (1) above, wherein the α-aminoalkylphenone compound (A1) having a molar absorption coefficient as measured at a wavelength of 365 nm of 100 (l/mol·cm) or more and less than 100,000 (l/mol·cm) is 2-benzyl-2-dimethylamino-1-(4-morpholinophenyl)butan-1-one or 2-(dimethylamino)-2-[(4-methylphenyl)methyl]-1-(4-morpholino-phenyl)butan-1-one.

(3) The active energy ray-curable ink described in the item (1) above, wherein the acylphosphine oxide compound (A2) having a molar absorption coefficient as measured at a wavelength of 365 nm of 100 (l/mol·cm) or more and less than 100,000 (l/mol·cm) is 2,4,6-trimethylbenzoyl-diphenyl-phosphine oxide or bis(2,4,6-trimethylbenzoyl)phenylphosphine oxide.

(4) The active energy ray-curable ink described in the item (1) above, which further comprises a tertiary amine compound (C) having a molar absorption coefficient as measured at a wavelength of 365 nm of 1 (l/mol·cm) or less.

(5) The active energy ray-curable ink described in the item (1) above, wherein the tertiary amine compound (C) having a molar absorption coefficient as measured at a wavelength of 365 nm of 1 (l/mol·cm) or less is an aromatic tertiary amine compound.

(6) The active energy ray-curable ink described in the item (5) above, wherein the aromatic tertiary amine compound (C) is ethyl p-dimethylaminobenzoate.

(7) The active energy ray-curable ink described in the item (1) or (4) above, wherein the active energy ray-curable ink is cured by a light-emitting diode emitting a bright line in the range of 350 to 420 nm.

(8) The active energy ray-curable ink described in the item (1) or (4) above, wherein the active energy ray-curable ink further comprises a pigment, a resin and an acrylic group-containing compound.

(9) The active energy ray-curable ink described in the item (1) or (4) above, wherein the active energy ray-curable ink is an ink for use in a lithographic printing, a letter press printing, an intaglio printing or a stencil printing.

(10) A multicolor set of active energy ray-curable inks comprising that:
each of the active energy ray-curable inks of the multicolor set is made of the active energy ray-curable ink described in the item (1) or (4), and
a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in an active energy ray-curable ink disposed on a closest side to an active energy ray irradiation source when multicolor printed is 0% to 80% of a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in an active energy ray-curable ink disposed on a farthest side to an active energy ray irradiation source.

(11) The multicolor set of active energy ray-curable inks described in the item (10) above, wherein the multicolor set made of the active energy ray-curable inks include at least a yellow ink, a magenta ink, a cyan ink and black ink.

(12) The multicolor set of the active energy ray-curable inks described in the item (11) above, wherein a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in a yellow ink is 0% to 80% of a larger one of weight concentrations of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm) contained in a black ink and a cyan ink.

(13) The multicolor set of active energy ray-curable inks described in the item (11) above, wherein a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm) contained in a black ink and a magenta ink is from 0.5% to 5%.

(14) The multicolor set of active energy ray-curable inks described in the item (11) above, wherein a yellow pigment contained in the yellow ink has a relative intensity (absorbance A/absorbance B) of absorbance A as measured at a wavelength of 365 nm to absorbance B as measured at a wavelength 430 nm, which are absorbances obtained from an absorption spectrum of a solution obtained by dissolving the yellow pigment in N,N-dimethylformamide, is 0.50 or less.

(15) The multicolor set of active energy ray-curable inks described in the item (14) above, wherein the yellow pigment is at least one selected from C.I. Pigment Yellow 74, C.I. Pigment Yellow 12, C.I. Pigment Yellow 13 and C.I. Pigment Yellow 83.

(16) The multicolor set of active energy ray-curable inks described in the item (11) above, wherein a magenta pigment contained in the magenta ink has a relative intensity (absorbance A/absorbance C) of absorbance A as measured at a wavelength of 365 nm to absorbance C as measured at a wavelength 530 nm, which are absorbances obtained from an absorption spectrum of a solution obtained by dissolving the magenta pigment in isopropyl alcohol, is 1.00 or less.

(17) The multicolor set of active energy ray-curable inks described in the item (16) above, wherein the magenta pigment is at least one selected from C.I. Pigment Red 57:1, C.I. Pigment Red 184 and C.I. Pigment Red 185.

(18) The multicolor set of active energy ray-curable inks described in the item (11) above, wherein a cyan pigment constituting the cyan ink is Pigment Blue 15.

(19) A method for producing an ink cured matter comprising:
printing with inks of the multicolor set described in any one of items (10) to (18) above; and
curing printed inks with a light-emitting diode emitting a bright line in the range of from 350 to 420 nm.

(20) The method for producing an ink cured matter described in the item (19) above, wherein the printing is an overprinting and after the overprinting, overprinted inks are collectively cured with a light-emitting diode emitting a bright line in the range of from 350 to 420 nm.

(21) A printed matter obtained by the method for producing an ink cured matter described in the item (19) or (20).

In the invention, "l" in a unit (l/mol·cm) of the molar absorption coefficient means "liter" that is a volumetric unit. The molar absorption coefficient is obtained by measuring absorbance of a solution obtained by dissolving a photoinitiator at a known concentration in acetonitrile with UV-visible ray spectrophotometer UV-3600 (manufactured by Shimadzu Corporation).

Effects of the Invention

According to the invention, an active energy ray-curable ink that has excellent curability to irradiation of active energy rays, in particular, UV-rays due to a UV-LED that emits UV-rays in the range of 350 to 420 nm and has excellent surface and internal curability even if overprinting is performed is obtained. The ink obtained can be used as an ink for various existing known printing methods such as an offset printing ink, a letterpress printing ink, an intaglio printing ink and a stencil printing ink. Further, an active energy ray-curable ink excellent in the printing aptitude when the ink is applied to any of the known printing methods and excellent in storage stability can be obtained. Furthermore, even when a UV-LED is used as a UV-ray irradiation device, a printed matter same as that of the case where an existing known UV-curable ink is used and a light source such as a mercury lamp or a metal halide lamp is used as a UV-ray irradiation lamp can be obtained using the active energy ray-curable ink of the invention.

BEST MODE FOR CARRYING OUT THE INVENTION

An active energy ray-curable ink such as a UV-ray curable ink is well known as a printing ink. In general, a light source emitting UV-rays such as a high-pressure mercury lamp with electrodes, a metal halide lamp with electrodes, a high-pressure mercury lamp not having an electrode or a metal halide lamp not having an electrode is used to cure the ink. However, while the existing UV-curable ink can produce a sufficient cured matter when the UV-ray irradiation device such as mentioned above is used as a UV-ray irradiation light source, the curability is not necessarily sufficient when a UV-LED emitting monochromatic light is used. The invention can provide an active energy ray-curable ink that can be printed and cured according to a method similar to an existing method when so far known UV-ray irradiation light source is used and can also obtain printability and curability similar to those of the case where an existing UV-curable ink is used and an existing high-pressure mercury lamp or a metal halide lamp is used to cure even when a UV-LED that emits monochromatic light is used as the UV-ray irradiation light source. In the active energy ray-curable ink of the invention, excellent printability and curability like this can be obtained not only in monochromatic printing but also in multicolor overprinting. In addition, a beautiful printed matter can be obtained speedily. The active energy ray in the invention means energy necessary to excite a starting material of a curing reaction from a ground state to a transition state, indicates UV-rays or electron beams, and is particularly preferably UV-rays in the range of 350 to 420 nm emitted from a UV-LED.

Thus, an active energy ray-curable ink of the invention is designed so as to be optimized to a monochromatic light source such as a light-emitting diode (UV-LED) emitting UV-rays in the range of 350 to 420 nm. An active energy ray-curable ink of the invention is characterized by being, as a photopolymerization initiator for active energy ray, a combination of a photocleavage type polymerization initiator (A) having a molar absorption coefficient as measured at a wavelength of 365 nm of 100 (l/mol·cm) or more, particularly a photocleavage type polymerization initiator (A) comprising an α-aminoalkylphenone compound (A1) having a molar absorption coefficient as measured at a wavelength of 365 nm of 100 (l/mol·cm) or more and less than 100,000 (l/mol·cm) and/or an acylphosphine oxide compound (A2) having a molar absorption coefficient as measured at a wavelength of 365 nm of 100 (l/mol·cm) or more and less than 100,000 (l/mol·cm); a hydrogen abstraction type polymerization initiator (B) comprising 4,4'-dialkylaminobenzophenone having a molar absorption coefficient as measured at a wavelength of 365 nm of 10,000 (l/mol·cm) or more and less than 1,000,000 (l/mol·cm); and, as required, a tertiary amine compound (C) having a molar absorption coefficient as measured at a wavelength of 365 nm of 1 (l/mol·cm) or less.

A photocleavage type polymerization initiator (A) having a molar absorption coefficient as measured at a wavelength of 365 nm of 100 (l/mol·cm) or more and less than 100,000 (l/mol·cm) is a photopolymerization initiator, whose molar absorption coefficient as measured at a wavelength of 365 nm in an acetonitrile solution is 100 (l/mol·cm) and less than 100,000 (l/mol·cm). The photocleavage type polymerization initiators (A) having a molar absorption coefficient as measured at a wavelength of 365 nm of 100 (l/mol·cm) or more can be used singularly or in a combination of two or more kinds thereof. However, it is particularly preferred that an α-aminoalkylphenone compound (A1) having a molar absorption coefficient as measured at a wavelength of 365 nm of 100 (l/mol·cm) or more and less than 100,000 (l/mol·cm) and an acylphosphine oxide compound (A2) having a molar absorption coefficient as measured at a wavelength of 365 nm of 100 (l/mol·cm) or more and less than 100,000 (l/mol·cm) are used in combination.

Examples of the α-aminoalkylphenone compound (A1) having a molar absorption coefficient as measured at a wavelength of 365 nm of 100 (l/mol·cm) or more and less than 100,000 (l/mol·cm) include 2-benzyl-2-dimethylamino-1-(4-morpholinophenyl) butan-1-one, 2-(dimethylamino)-2-(4-methylbenzyl)-1-(4-morpholinophenyl)-butan-1-one, 1,2-octannedione, 1-[(4-phenylthio), -2-(O-benzyloxime)], 1-[9-ethyl-6-(2-methylbenzoyl)-9H-carbazole-3-yl]-, 1-(O-acetyloxime), 3,6-bis(2-methyl-2-morpholino-propanonyl)-9-butylcarbazole, 2-methyl-1-[4-(methylthio)-phenyl]]-2-morpholinopropan-1-one, 2-hydroxy-1-{4-[4-(2-hydroxy-2-methyl-propyonyl)-benzyl]-phenyl}-2-methyl-propan-1-one, 2,2-dimethoxy-1,2-diphenylethan-1-one, and 2,2-diethoxy-1,2-diphenylethan-1-one. These may be used singularly or in a combination of two or more kinds thereof.

Among those mentioned above, a compound having a molar absorption coefficient as measured at 365 nm of 100 (l/mol·cm) or more and less than 100,000 (l/mol·cm) and a molar absorption coefficient at 405 nm of 100 (l/mol·cm) or more and less than 100,000 (l/mol·cm) is particularly preferred. Examples of the compounds like this include, for example, 2-benzyl-2-dimethylamino-1-(4-morpholinophenyl)butan-1-one, 2-(dimethylamino)-2-(4-methylbenzyl)-1-(4-morpholinophenyl)-butan-1-one, 2-(dimethylamino)-2-[(4-methylphenyl)methyl]-1-(4-morpholinophenyl)butan-1-one, 2,4-diethylthioxanthone, 2,4-dichlorothioxanthone, 1-chloro-4-propoxythioxanthone, 2-hydroxy-3-(3,4-dimethyl-9-oxo-9Hthioxanthone-2-iloxy-N,N,N-trimethyl-1-propan amine hydrochloride, and trichloromethyltriazines such as 2,4-bis(trichloromethyl)-6-(4-methoxyphenyl)triazine, 2,4-bis(trichloromethyl)-6-(4-methoxystyryl)triazine, and 2,4-bis(trichloromethyl)-6-(4-methoxy-1-naphtyl)triazine.

More preferable examples thereof include 2-(dimethylamino)-2-(4-methylbenzyl)-1-(4-morpholinophenyl)-butan-1-one and 2-(dimethylamino)-2-[(4-methylphenyl)-methyl]-1-(4-morpholinophenyl)-butan-1-one from the viewpoint of solubility to resins.

On the other hand, examples of acylphosphine oxide compound (A2) having a molar absorption coefficient as measured at a wavelength of 365 nm of 100 (l/mol·cm) or more and less than 100,000 (l/mol·cm) include bis(2,4,6-trimethylbenzoyl)-phenylphosphine oxide, 2,4,6-trimethylbenzoyl-diphenylphosphine oxide and bis(2,6-dimethoxybenzoyl)-2,4,4-trimethyl-pentylphosphine oxide. Among these, 2,4,6-trimethylbenzoyldiphenylphosphine oxide is desirable particularly from the viewpoint of solubility to resins. The acylphosphine oxide compounds (A2) having a molar absorption coefficient as measured at a wavelength of 365 nm of 100 (l/mol·cm) or more and less than 100,000 (l/mol·cm) can be used singularly or in a combination of two or more kinds thereof.

A hydrogen abstraction type polymerization initiator (B) comprising 4,4'-dialkylaminobenzophenone having a molar absorption coefficient as measured at a wavelength of 365 nm of 10,000 (l/mol·cm) or more and less than 1,000,000 (l/mol·cm) is a photopolymerization initiator, whose molar absorption coefficient as measured at a wavelength of 365 nm in an acetonitrile solution is 10,000 (l/mol·cm) or more and less than 1,000,000 (l/mol·cm). Examples thereof include 4,4'-dialkylaminobenzophenones such as 4,4'-bisdimethylaminobenzophenone and 4,4'-bisdiethylaminobenzophenone. Among these, 4,4'-bisdiethylaminobenzophenone is preferred from the viewpoint of safety. The hydrogen abstraction type polymerization initiators (B) comprising 4,4'-dialkylaminobenzophenone having a molar absorption coefficient as measured at a wavelength of 365 nm of 10,000 (l/mol·cm) or more and less than 1,000,000 (l/mol·cm) may be used singularly or in a combination of two or more kinds thereof.

A tertiary amine compound (C) having a molar absorption coefficient as measured at a wavelength of 365 nm of 1 (l/mol·cm) or less is a compound, whose molar absorption coefficient as measured at a wavelength of 365 nm in an acetonitrile solution is 1 (l/mol·cm) or less and is preferably an aromatic tertiary amine compound. Examples of the aromatic tertiary amine compound include, for example, N,N-dimethylaniline, N,N-diethylaniline, N,N-dimethyl-p-toluidine, ethyl N,N-dimethylamino-p-benzoate, N,N-dihydroxyethylaniline, triethylamine and N,N-dimethylhexylamine. The tertiary amine compounds (C) having a molar absorption coefficient at a wavelength of 365 nm of 1 (l/mol·cm) or less may be used singularly or in a combination of two or more kinds thereof. Among these, ethyl N,N-dimethylamino-p-benzoate and isoamylethyl N,N-dimethylamino-p-benzoate are particularly preferred.

As mentioned above, by using a photocleavage type polymerization initiator (A) comprising an α-aminoalkylphenone compound (A1) having a molar absorption coefficient as measured at a wavelength of 365 nm of 100 (l/mol·cm) or more and less than 100,000 (l/mol·cm) and/or an acylphosphine oxide compound (A2) having a molar absorption coefficient as measured at a wavelength of 365 nm of 100 (l/mol·cm) or more and less than 100,000 (l/mol·cm); a hydrogen abstraction type photopolymerization initiator (B) comprising 4,4'-dialkylaminobenzophenone having a molar absorption coefficient as measured at a wavelength of 365 nm of 10,000 (l/mol·cm) or more and less than 1,000,000 (l/mol·cm); and, as required, a tertiary amine compound (C) having a molar absorption coefficient as measured at a wavelength of 365 nm of 1 (l/mol·cm) or less as a polymerization initiator in combination, an active energy ray-curable ink excellent in a printing property including the curability can be obtained in the invention even if a UV-LED is used as a UV-ray irradiation light source. The reason for this is not yet clear. However, the reason is roughly inferred as shown below. However, the present invention is not restricted thereby.

It is considered that by use of photopolymerization initiators different in absorption wavelength, photopolymerization initiators can efficiently absorb light emitted from a UV-LED to improve the curability and by use of a tertiary amine compound having a small absorption around 365 nm, the compound works as a photopolymerization accelerator without disturbing light absorption of the other photopolymerization initiators.

Components other than the components (A1), (A2), (B) and (C) of the active energy ray-curable inks of the invention may be any one as long as an active energy ray-curable ink is obtained without injuring advantageous effects of the invention. As such components, there can be exemplified a resin, a pigment, an acrylic group-containing compound that is a photopolymerizable compound and an additive.

As the resin, well known resins added to an active energy ray-curable ink such as existing UV-curable inks can be exemplified. As such resins, thermosetting or thermoplastic resins are cited and examples thereof include, for example, polyvinyl chloride, poly(meth)acrylate, an epoxy resin, a polyurethane resin, a cellulose derivative (such as ethyl cellulose, cellulose acetate and nitrocellulose), a vinyl chloride/vinyl acetate copolymer, a polyamide resin, a polyvinyl acetal resin, a diallylphthalate resin, and a synthetic rubber such as a butadiene-acrylonitrile copolymer. These resins can be used singularly or in a combination of two or more kinds thereof. Further, examples of resins for a hybrid ink that has combined characteristics of an oil-based ink and an active energy ray-curable ink include a rosin-modified phenol resin, a rosin-modified alkyd resin, a petroleum resin-modified alkyd resin, and a styrene-acrylic resin (such as styrene-isobornyl acrylic resin) and animal or plant oil or aliphatic acid monoesters thereof as well can be used.

As a pigment, an inorganic pigment and an organic pigment can be exemplified. Examples of the inorganic pigment include chrome yellow, zinc chrome, iron blue, barium sulfate, cadmium red, titanium oxide, zinc oxide, magenta, alumina white, calcium carbonate, ultramarine, carbon black, graphite, aluminum powder, and red iron oxide. Examples of the organic pigment include various kinds of well known and well used pigments such as: soluble azo pigments such as β-naphthol series, β-oxynaphthoic acid series, β-oxynaphthoic acid based anilide series, acetoacetic acid anilide series, and pyrazolone series; insoluble azo pigments such as monoazo pigment such as β-naphthol series, β-oxynaphthoic acid based anilide series, acetoacetic acid anilide series, disazo pigment such as acetoacetic acid anilide series and pyrazolone series; phthalocyanine pigments such as copper phthalocyanine blue, halogenated (chlorinated or brominated) copper phthalocyanine blue, sulfonated copper phthalocyanine blue and metal free phthalocyanine; and polycyclic pigments or heterocyclic pigments such as quinacridone series, dioxazine series, threne series (such as pyranthrone, anthanthrone, indanthrone, anthrapyrimidine, flavanthrone, thioindigo, anthraquinone series, perynone series and perylene series), isoindolinone series, metal complex series, or quinophthalone series.

As the acrylic group-containing compounds used in the invention, acrylic group-containing compounds that have been used in existing UV-curable inks can be used. Examples of acrylic group-containing monomer include a monofunctional monomer, a bifunctional monomer, a trifunctional monomer and a tetrafunctional monomer.

Examples of the monofunctional monomer include alkyl (having 1 to 18 carbon atoms) (meth)acrylate such as methyl (meth)acrylate, ethyl(meth)acrylate, butyl(meth)acrylate, hexyl(meth)acrylate, octyl(meth)acrylate, dodecyl(meth)acrylate, and stearyl(meth)acrylate; benzyl(meth)acrylate, (meth)acrylic ester of ethylene oxide adduct of alkyl phenol such as butyl phenol, octyl phenol, nonyl phenol or dodecyl phenol, isobolnyl(meth)acrylate, cyclohexyl(meth)acrylate, tricyclodecane monomethylol(meth)acrylate, 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, hydroxypentyl(meth)acrylate, 2-hydroxy-3-phenoxypropyl(meth)acrylate, 2-hydroxy-3-butoxypropyl(meth)acrylate, 2-hydroxy-3-methoxypropyl (meth)acrylate, diethylene glycol mono(meth)acrylate, triethylene glycol mono(meth)acrylate, polyethylene glycol mono(meth)acrylate, dipropylene glycol mono(meth)acrylate, polypropylene glycol mono(meth)acrylate, glycerin mono(meth)acrylate, acryloxyethyl phthalate, 2-(meth)acryroyloxyethyl-2-hydroxyethyl phthalate, 2-(meth)acryroyloxypropyl phthalate, β-carboxyethyl(meth)acrylate, (meth)acrylic dimer, ω-carboxy-polycaprolactone mono (meth)acrylate, dimethylaminoetyl(meth)acrylate, diethylaminoethyl(meth)acrylate, N-vinylpyrrolidone, N-vinylformamide, and (meth) acryloylmorpholine.

Examples of the bifunctional monomer include ethylene glycol di(meth)acrylate, diethylene glycol di(meth)acrylate, triethylene glycol di(meth)acrylate, polyethylene glycol di(meth)acrylate, propyleneglycoldi(meth)acrylate, dipropylene glycol di(meth)acrylate, tripropylene glycol di(meth)acrylate, polypropylene glycol di(meth)acrylate, butylene glycol di(meth)acrylate, pentyl glycol di(meth)acrylate, neopentyl glycol di(meth)acrylate, hydroxy pivaryl hydroxypivarate di(meth)acrylate (commonly called manda), hydroxy pivaryl hydroxypivarate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethylol octane di(meth)acrylate (manufactured by Mitsubishi Chemical Corporation), 2-ethyl-1,3-hexanediol di(meth)acrylate, 2,5-dimethyl-2,5-hexanediol di(meth)acrylate, 2-buthyl-2-ethyl-1,3-propanediol di(meth)acrylate, 2,4-diethyl-1,5-pentanediol di(meth)acrylate tricyclodecane dimethylol di(meth)acrylate, tricyclodecane dimethylol dicaprolactonate di(meth)acrylate, bisphenol-A tetraethylene oxide adduct di(meth)acrylate, bisphenol-F tetraethylene oxide adduct di(meth)acrylate, bisphenol-S tetraethylene oxide adduct di(meth)acrylate, hydrogenated bisphenol-A tetraethylene oxide adduct di(meth)acrylate, hydrogenated bisphenol-F tetraethylene oxide adduct di(meth)acrylate, bisphenol-A tetraethylene oxide adduct dicaprolactonate di(meth)acrylate, bisphenol-F tetraethylene oxide adduct dicaprolactonate di(meth)acrylate, and the like.

Examples of the trifunctional monomer include glycerin tri(meth)acrylate, trimethylolpropane tri(meth)acrylate, trimethylolpropane tricaprolactonate tri(meth)acrylate, trimethylolethane tri(meth)acrylate, trimethylolhexane tri(meth)acrylate, trimethyloloctane tri(meth)acrylate, pentaerythritol tri(meth)acrylate, and the like.

Examples of the tetra or more-functional monomer include pentaerythritol tetra(meta)acrylate, pentaerythritol tetracaprolactonate tetra(meta)acrylate, diglycerin tetra(meth)acrylate, ditrimethylolpropane tetra(meth)acrylate, ditrimethylolpropane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, tripentaerythritol octa(meth)acrylate, tripentaerythritol polyalkylene oxide hepta(meth)acrylate, and the like.

Further, as the compound having one or more acrylic groups, there are exemplified a fatty alcohol compound alkylene oxide adduct (meth)acrylate. Examples of the fatty alcohol compound alkylene oxide adduct (meth)acrylate monomer include mono or poly (1 to 20)-(meth)acrylate of mono or poly (1 to 20)-alkylene oxide (which has 1 to 20 carbon atoms) of fatty alcohol compound. The alkylene oxides include, for example, ethylene oxide, propylene oxide, butylene oxide, pentylene oxide, hexylene oxide, and the like.

Examples of the monofunctional monomer include C1-C20 alkylene oxide adduct (meth)acrylate such as methanol mono or poly (1-20)-alkylene (C1-C20) oxide (for example, ethylene oxide, propylene oxide or butylene oxide) adduct (meth)acrylate, ethanol mono or poly (1-20)-C2-C20 alkylene oxide (for example, ethylene oxide, propylene oxide or butylene oxide) adduct (meth)acrylate, butanol mono or poly (1-20)-C2-C20 alkylene oxide (for example, ethylene oxide, propylene oxide or butylene oxide) adduct (meth)acrylate, hexanol mono or poly (1-20)-C2-C20 alkylene oxide (for example, ethylene oxide, propylene oxide or butylene oxide) adduct(meth)acrylate, octanol mono or poly (1-20)-C2-C20 alkylene oxide (for example, ethylene oxide, propylene oxide or butylene oxide) adduct(meth)acrylate, dodecanol mono or poly (1-20)-C2-C20 alkylene oxide (for example, ethylene oxide, propylene oxide or butylene oxide) adduct(meth)acrylate, stearyl mono or poly (1-20)-C2-C20 alkylene oxide (for example, ethylene oxide, propylene oxide or butylene oxide) adduct(meth)acrylate, butylphenol, octylphenol, nonylpehnol or dodecylphenol mono or poly (1-20)-C2-C20 alkylene oxide (for example, ethylene oxide, propylene oxide or butylene oxide) adduct (meth)acrylate, and the like.

Examples of the bifunctional monomer include ethylene glycol mono or poly (2-20)-C2-C20 alkylene oxide (for example, ethylene oxide, propylene oxide or butylene oxide) adduct di(meth)acrylate, diethylene glycol mono or poly (2-20)-C2-C20 alkylene oxide (for example, ethylene oxide, propylene oxide or butylene oxide) adduct di(meth)acrylate, triethylene glycol poly (2-20)-C2-C20 alkylene oxide (for example, ethylene oxide, propylene oxide or butylene oxide) adduct di(meth)acrylate, polyethylene glycol poly (2-20)-C2-C20 alkylene oxide (for example, ethylene oxide, propylene oxide or butylene oxide) adduct di(meth)acrylate, propylene glycol poly (2-20)-C2-C20 alkylene oxide (for example, ethylene oxide, propylene oxide or butylene oxide) adduct di(meth)acrylate, dipropylene glycol poly (2-20)-C2-C20 alkylene oxide (for example, ethylene oxide, propylene oxide or butylene oxide) adduct di(meth)acrylate, tripropyleneglycolpoly (2-20)-C2-C20 alkylene oxide (for example, ethylene oxide, propylene oxide or butylene oxide) adduct di(meth)acrylate, polypropylene glycol poly (2-20)-C2-C20 alkylene oxide (for example, ethylene oxide, propylene oxide or butylene oxide) adduct di(meth)acrylate, butylene glycol poly (2-20)-C2-C20 alkylene oxide (for example, ethylene oxide, propylene oxide or butylene oxide) adduct di(meth)acrylate, pentyl glycol poly (2-20)-C2-C20 alkylene oxide (for example, ethylene oxide, propylene oxide or butylene oxide) adduct di(meth)acrylate, di(meta-neopentyl glycol) poly (2-20)-C2-C20 alkylene oxide (for example, ethylene oxide, propylene oxide or butylene oxide) adduct di(meth)acrylate, hydroxylpivaryl hydroxypivarate poly (2-20)-C2-C20 alkylene oxide (for example, ethylene oxide, propylene oxide or butylene oxide) adduct di(meth)acrylate (commonly called manda), hydroxylpivaryl hydroxylpivarate dicaprolactonate poly (2-20)-C2-C20 alkylene oxide (for example, ethylene oxide, propylene oxide or butylene oxide) adduct di(meth)acrylate, 1,6-hexanediol poly (2-20)-C2-C20 alkylene oxide (for example, ethylene oxide, propylene oxide or butylene oxide) adduct di(meth)acrylate, 1,6-hexanediol poly (2-20) alkylene oxide (for example, ethylene oxide, propylene oxide or butylene oxide) adduct di(meth)acrylate, 1,2-hexanediol poly (2-20)-C2-C20 alkylene oxide (for example, ethylene oxide, propylene oxide or butylene oxide) adduct di(meth)acrylate, 1,5-hexanediol poly di(meth) acrylate, 2,5-hexanediol poly (2-20)-C2-C20 alkylene oxide (for example, ethylene oxide, propylene oxide or butylene oxide) adduct di(meth)acrylate, 1,7-heptanediol poly (2-20)-C2-C20 alkylene oxide (for example, ethylene oxide, propylene oxide or butylene oxide) adduct di(meth)acrylate, 1,8-octanediol poly (2-20)-C2-C20 alkylene oxide (for example, ethylene oxide, propylene oxide or butylene oxide) adduct di(meth)acrylate, 1,2-octanediol poly (2-20)-C2-C20 alkylene oxide (for example, ethylene oxide, propylene oxide or butylene oxide) adduct di(meth)acrylate, 1,9-nonaediol poly (2-20)-C2-C20 alkylene oxide (for example, ethylene oxide, propylene oxide or butylene oxide) adduct di(meth)acrylate, 1,2-decanediol poly (2-20)-C2-C20 alkylene oxide (for example, ethylene oxide, propylene oxide or butylene oxide) adduct di(meth)acrylate, 1,10-decanediol poly (2-20)-C2-C20 alkylene oxide (for example, ethylene oxide, propylene oxide or butylene oxide) adduct di(meth)acrylate, 1,2-decanediol poly (2-20)-C2-C20 alkylene oxide (for example, ethylene oxide, propylene oxide or butylene oxide) adduct di(meth)acrylate, 1,12-dodecanediol poly (2-20)-C2-C20 alkylene oxide (for example, ethylene oxide, propylene oxide or butylene oxide) adduct di(meth)acrylate, 1,2-dodecanediol mono or poly (1-20)-C2-C20 alkylene oxide (for example, ethylene oxide, propylene oxide or butylene oxide) adduct di(meth)acrylate, 1,14-tetradecanediol poly (2-20)-C2-C20 alkylene oxide (for example, ethylene oxide, propylene oxide or butylene oxide) adduct di(meth)acrylate, 1,2-tetradecanediol poly (2-20)-C2-C20 alkylene oxide (for example, ethylene oxide, propylene oxide or butylene oxide) adduct di(meth)acrylate, 1,16-hexadecanediolmonoorpoly (2-20)-C2-C20 alkyleneoxide (for example, ethylene oxide, propylene oxide or butylene oxide) adduct di(meth)acrylate, 1,2-hexadecanediolpoly (2-20)-C2-C20 alkylene oxide (for example, ethylene oxide, propylene oxide or butylene oxide) adduct di(meth)acrylate, 2-methyl-2,4-pentanediol poly (2-20)-C2-C20 alkylene oxide (for example, ethylene oxide, propylene oxide or butylene oxide) adduct di(meth)acrylate, 3-methyl-1,5-pentanediol poly (2-20)-C2-C20 alkylene oxide (for example, ethylene oxide, propylene oxide or butylene oxide) adduct di(meth)acrylate, 2-methyl-2-propyl-1,3-propanediol poly (2-20)-C2-C20 alkylene oxide (for example, ethylene oxide, propylene oxide or butylene oxide) adduct di(meth)acrylate, 2,4-dimethyl-2,4-pentanediol poly (2-20)-C2-C20 alkylene oxide (for example, ethylene oxide, propylene oxide or butylene oxide) adduct di(meth)acrylate, 2,2-diethyl-1,3-propanediol mono or poly (2-20)-C2-C20 alkylene oxide (for example, ethylene oxide, propylene oxide or butylene oxide) adduct di(meth)acrylate, 2,2,4-trimethyl-1,3-pentanediol mono or poly (2-20)-C2-C20 alkylene oxide (for example, ethylene oxide, propylene oxide or butylene oxide) adduct di(meth)acrylate, dimethylol octane poly (2-20)-C2-C20 alkylene oxide (for example, ethylene oxide, propylene oxide or butylene oxide) adduct di(meth)acrylate, 2-ethyl-1,3-hexanediol poly (2-20)-C2-C20 alkylene oxide (for example, ethylene oxide, propylene oxide or butylene oxide) adduct di(meth)acrylate, 2,5-dimethyl-2,5-hexanediol poly (2-20)-C2-C20 alkylene oxide (for example, ethylene oxide, propylene oxide or butylene oxide) adduct di(meth)acrylate, 2-methyl-1,8-octanediol poly (2-20)-C2-C20 alkylene oxide (for example, ethylene oxide, propylene oxide or butylene oxide) adduct di(meth)acrylate, 2-butyl-2-ethyl-1,3-propanediol poly (2-20)-C2-C20 alkylene oxide (for example, ethylene oxide, propylene oxide or butylene oxide) adduct di(meth)acrylate, 2,4-diethyl-1,5-pentanediol poly (2-20)-C2-C20 alkylene oxide (for example, ethylene oxide, propylene oxide or butylene oxide) adduct di(meth)acrylate, and the like.

Examples of the trifunctional monomer include glycerin poly (2-20)-C2-C20 alkylene oxide (for example, ethylene oxide, propylene oxide or butylene oxide) adduct tri(meth)acrylate, trimethylolpropanepoly (2-20)-C2-C20 alkylene oxide (for example, ethylene oxide, propylene oxide or butylene oxide) adduct tri(meth)acrylate, trimethylolethanepoly (2-20)-C2-C20 alkylene oxide (for example, ethylene oxide, propylene oxide or butylene oxide) adduct tri(meth)acrylate, trimethylolhexane poly (2-20)-C2-C20 alkylene oxide (for example, ethylene oxide, propylene oxide or butylene oxide) adduct tri(meth)acrylate, trimethyloloctanepoly (2-20)-C2-C20 alkylene oxide (for example, ethylene oxide, propylene oxide or butylene oxide) adduct tri(meth)acrylate, trimethyloloctanepoly (3-20)-O2-C20 alkylene oxide (for example, ethylene oxide, propylene oxide or butylene oxide) adduct tri(meth)acrylate, pentaerythritol poly (2-20)-C2-C20 alkylene oxide (for example, ethylene oxide, propylene oxide or butylene oxide) adduct tri(meth)acrylate, and the like.

Examples of the tetra or more-functional monomer include pentaerythritol poly (2-20)-C2-C20 alkylene oxide (for example, ethylene oxide, propylene oxide or butylene oxide) adduct tetra(meth)acrylate, ditrimethylolpropane poly (2-20)-C2-C20 alkylene oxide (for example, ethylene oxide, propylene oxide or butylene oxide) adduct tetra(meth)acrylate, ditrimethylolpropane poly (2-20) alkylene oxide (for example, ethylene oxide, propylene oxide or butylene oxide) tetra(meth)acrylate, ditrimethylolpropane tetracaprolactonate tetra(meth)acrylate, ditrimethylolethane poly (2-20)-C2-C20 alkylene oxide (for example, ethylene oxide, propylene oxide or butylene oxide) adduct tetra(meth)acrylate, ditrimethylolethane poly (2-20) alkylene oxide (for example, ethylene oxide, propylene oxide or butylene oxide) tetra (meth)acrylate, ditrimethylolbutane (2-20) alkylene oxide (for example, ethylene oxide, propylene oxide or butylene oxide) tetra(meth)acrylate, ditrimethylolhexane poly (2-20)-C2-C20 alkylene oxide (for example, ethylene oxide, propylene oxide or butylene oxide) adduct tetra(meth)acrylate, ditrimethylolhexane poly (2-20) alkylene oxide (for example, ethylene oxide, propylene oxide or butylene oxide) tetra (meth)acrylate, ditrimethlolloctane poly(2-20)-C2-C20 alkylene oxide (for example, ethylene oxide, propylene oxide or butylene oxide) adduct tetra(meth)acrylate, ditrimethyloloctane poly (4-200) alkylene oxide (for example, ethylene oxide, propylene oxide or butylene oxide) tetra(meth)acrylate, dipentaerythritol poly (5-20)-C2-C20 alkylene oxide (for example, ethylene oxide, propylene oxide or butylene oxide) adduct penta(meth)acrylate, dipentaerythritol poly (2-20)-C2-C20 alkylene oxide (for example, ethylene oxide, propylene oxide or butylene oxide) adduct hexa(meth)acrylate, dipentaerythritolhexacaprolactonate poly (2-20)-C2-C20 alkylene oxide (for example, ethylene oxide, propylene oxide or butylene oxide) adduct hexa(meth)acrylate, tripentaerythritol poly (2-20)-C2-C20 alkylene oxide (for example, ethylene oxide, propylene oxide or butylene oxide) adduct hepta(meth)acrylate, tripentaerythritol poly (2-20)-C2-C20 alkylene oxide (for example, ethylene oxide, propylene oxide or butylene oxide) adduct octa(meth)acrylate, tripentaerythritol poly (2-20)-C2-C20 alkylene oxide (for example, ethylene oxide, propylene oxide or butylene oxide) adduct hexa (meth)acrylate, tripentaerythritol poly alkylene oxide hepta (meth)acrylate, tripentaerythritol poly (2-20)-C2-C20 alkylene oxide (for example, ethylene oxide, propylene oxide or butylene oxide) adduct octa(meth)acrylate, and so on.

Furthermore, as the acrylic group-containing compound in the invention, active energy ray-curable acrylic oligomer, urethane (meth)acrylate, epoxy (meth)acrylate and polyester (meth)acrylate as well can be appropriately used. Examples of the oligomer include polyol, esters of polybasic acid and (meth)acrylic acid, and epoxy acrylate. Examples of the polyol include ethylene glycol, glycerin, trimethylol propane and pentaerythritol. Examples of the polybasic acid include phthalic anhydride, isophthalic acid, succinic acid (anhydride), maleic acid (anhydride), adipic acid and sebacic acid. An esterification reaction of polyol, polybasic acid and (meth)acrylic acid is performed according to an ordinary method.

As the urethane (meth)acrylate, general aromatic or aliphatic urethane (meth)acrylates can be exemplified. Examples thereof include (meth)acrylates of tolylene diisocyanate, hexamethylene diisocyanate, isophorone diisocyanate and the like.

As the epoxy (meth)acrylate, general aromatic or aliphatic epoxy (meth)acrylates are exemplified. Examples thereof include (meth)acrylates of bisphenol A epoxy, bisphenol F epoxy, novolak epoxy, phosphoric acid based epoxy and the like.

As the polyester (meth)acrylate, general polyester (meth)acrylates, aliphatic acid-modified polyester, chlorinated polyester and the like are exemplified.

Furthermore, other additives can be used in the printing ink, as required. Examples of additives imparting, for example, friction resistance, anti-blocking property, slipping property and anti-scratch property include natural waxes such as carnauba wax, Japan wax, lanoline, montan wax, paraffin wax and microcrystalline wax; and synthetic waxes such as Fischer-Tropsch wax, polyethylene wax, polypropylene wax, polytetrafluoroethylene wax, polyamide wax and silicone compounds.

Examples of additives imparting, for example, storage stability of ink include polymerization inhibitors such as (alkyl)phenol, hydroquinone, catechol, resorcin, p-methoxyphenol, t-butylcatechol, t-butylhydroquinone, pyrogallol, 1,1-picryl hydrazyl, phenothiazine, p-benzoquinone, nitrosobenzene, 2,5-di-tert-butyl-p-benzoquinone, dithiobenzoyl disulfide, picric acid, cupferron, Aluminum N-nitrosophenylhydroxylamine, tri-p-nitrophenylmethyl, N-(3-oxyanilino-1,3-dimethyl-butylidene)aniline oxide, di-butylcresol, cyclohexanone oxime cresol, guaiacol, o-isopropylphenol, butyraldoxime, methyl ethyl ketoxime, and cyclohexanone oxime.

As other than the above, additives such as a UV-absorbent, an infrared absorbent, and an antibacterial agent can be added depending on required performance. Furthermore, a photopolymerization initiator other than the (A1), (A2), (B) and (C) can be added as an additive, if necessary.

Examples of initiator except for components (A1), (A2), (B) and (C) include benzophenone, 4-methyl-benzophenone, 2,4,6-trimethylbenzophenone, 2,3,4-trimethylbenzophenone, 4-phenylbenzophenone, 3,3'-dimethyl-4-methoxy benzophenone, 4-(1,3-acryloyl-1,4,7,10,13-pentaoxotridecyl) benzophenone, methyl-o-benzoyl benzoate, [4-(methylphenylthio)phenyl]phenyl methanone, (4-benzoylbenzyl)trimethylammonium chloride, 2-hydroxy-2-methyl-1-phenyl-propan-1-one, 1-(4-isopropylphenyl)-2-hydroxy-2-methyl-1-phenylpropan-1-one, 1-hydroxy-cyclohexyl-phenyl-ketone, polymer of 2-hydroxy-2-methyl-1-stylylpropan-1-one, diethoxy acetophenone, dibuthoxyacetopehnone, benzoinmethyl ether, benzoin ethyl ether, benzoin isopropyl ether, benzoin isobutyl ether, benzoin normalbutyl ether, and so on.

In the next place, a usage mode as a printing ink composition in the invention will be described. It is necessary that an active energy ray-curable composition of the invention is set to appropriate properties such as an appropriate viscosity and an appropriate color density depending on a printing method. Many active energy ray-curable ink of the invention is usually used as an ink for lithographic printing. When the active energy ray-curable ink of the invention is used as an ink for lithographic printing, the ink is usually used at a constitution comprising 10 to 30% by weight of the pigment, 20 to 50% by weight of the resin, 20 to 70% by weight of the acrylic group-containing compound, 0.01 to 1% by weight of the radical polymerization inhibitor, 1 to 20% by weight of the photopolymerization initiator for active energy rays, 0 to 10% by weight of a sensitizer and 0 to 10% by weight of other additives. When an acrylic resin is used as the resin, an acrylic resin is solid at room temperature. Accordingly, the acrylic resin is used as a resin varnish prepared by dissolving it in acrylic monomer or oligomer and further adding a radical polymerization inhibitor. In order to set the viscosity of the resin varnish to the viscosity of 100 to 300 Pa·s/25° C. which is a viscosity easy to prepare a printing ink composition, 20 to 50 parts by weight of the resin, 80 to 50 parts by weight of the acrylic monomer and oligomer and 0.01 to 1 parts by weight of the radical polymerization inhibitor are charged and heat-dissolved at a temperature from 80 to 120° C. for 30 min to 1 hr under air flow.

As a photopolymerization initiator for active energy rays, ratios of an α-aminoalkylphenone compound (A1) having a molar absorption coefficient as measured at a wavelength of 365 nm of 100 (l/mol·cm) or more and less than 100,000 (l/mol·cm); an acylphosphine oxide compound (A2) having a molar absorption coefficient as measured at a wavelength of 365 nm of 100 (l/mol·cm) or more and less than 100,000 (l/mol·cm); 4,4'-dialkylaminobenzophenone (B) having a molar absorption coefficient as measured at a wavelength of 365 nm of 10,000 (l/mol·cm) or more and less than 1,000,000 (l/mol·cm); a tertiary amine compound (C) having a molar absorption coefficient as measured at a wavelength of 365 nm of 1 (l/mol·cm) or less, a resin, a pigment, and an acrylic group-containing compound are determined suitably depending on required performance. In general, 4,4'-dialkylaminobenzophenone (B) having a molar absorption coefficient as measured at a wavelength of 365 nm of 10,000 (l/mol·cm) or more and less than 1,000,000 (l/mol·cm) is highly reactive to light in the vicinity of 365 nm to improve the curability of the ink. However, when the compound (B) is used excessively, intensity of the active energy ray in a depth direction is lowered and thereby the internal curability of the ink is remarkably lowered. Furthermore, when the compound (B) is used in excess, residual unreacted matter becomes a plasticizer; accordingly, the strength of ink film is deteriorated.

When a pigment concentration is less than 10% by weight, it is necessary to increase a thickness of an ink film to increase a color density of a printed matter. On the other hand, when the pigment concentration is too high, ink fluidity is lowered and the photoinitiator is disturbed from absorbing UV-rays; accordingly, the ink curability is deteriorated. While the photopolymerization initiator improves the ink curability, when it is used excessively, intensity of active energy rays in a depth direction is lowered and thereby the internal curability of ink is lowered. Furthermore, when the photopolymerization initiator is used excessively, residual unreacted matter becomes a plasticizer to deteriorate the strength of the ink film.

Accordingly, preferable amounts of components constituting the active energy ray-curable ink of the invention are, though different depending on combined constitutions, an irradiation amount of active energy rays, a film thickness and a use, preferably, 1 to 10% by weight of the α-aminoalkylphenone compound (A1) having a molar absorption coefficient as measured at a wavelength of 365 nm of 100 (l/mol·cm) or more and less than 100,000 (l/mol·cm); 1 to 10% by weight of the acylphosphine oxide compound (A2) having a molar absorption coefficient as measured at a wavelength of 365 nm of 100 (l/mol·cm) or more and less than 100,000 (l/mol·cm), 2 to 20% by weight in total of the (A1) and (A2); 0.5 to 10% by weight of the 4,4'-dialkylaminobenzophenone (B) having a molar absorption coefficient as measured at 365 nm of 10,000 (l/mol·cm) or more and less than 1,000,000 (l/mol·cm); 0.5 to 5% by weight of the tertiary amine compound (C) having a molar absorption coefficient as measured at a wavelength of 365 nm of 1 (l/mol·cm) or less; 20 to 30% by weight of the resin; 10 to 30% by weight of the pigment; and 20 to 70% by weight of the acrylate group-containing compound.

The active energy ray-curable ink of the invention can be used as an ink for an existing printing method such as a lithographic printing method, a letterpress printing method, an intaglio printing method or a stencil printing method. A printing ink can be produced according to a method similar to that of an existing UV-curable ink. For example, a lithographic printing ink is produced by kneading, mixing and controlling components of an ink composition such as the pigment, resin, acrylic monomer or oligomer, polymerization inhibitor, polymerization initiator and sensitizer such as amine compound, and other additives with a kneader, a three-roller mill, an attritor, a sand mill, or a gate mixer at a temperature from room temperature to 100° C.

Furthermore, a multicolor ink set comprising the active energy ray-curable inks of the invention includes at least yellow, magenta, cyan and black inks. When the multicolor set of active energy ray-curable inks of the invention is applied to multicolor printing, a weight concentration of a hydrogen abstraction type photopolymerization initiator (B) having a molar absorption coefficient as measured at 365 nm of 10,000 (l/mol·cm) or more and less than 1,000,000 (l/mol·cm) and contained in an active energy ray-curable ink on a closest side to an active energy ray irradiation source is preferably set to 0% to 80% of a weight concentration of a hydrogen abstraction type photopolymerization initiator (B) having a molar absorption coefficient as measured at 365 nm of 10,000 (l/mol·cm) or more of an active energy ray-curable ink on a not closest side to an active energy ray irradiation source. Thereby, an active energy ray-curable ink that has excellent photopolymerizability and internal curability in a multicolor overprinting portion of color inks when UV-ray around 365 nm is used is obtained. Usually, in the case of the process printing, multicolor overprinting of a black ink, a cyan ink, a magenta ink and a yellow ink is carried out in this order. Accordingly, when multicolor printing is carried out with a multicolor ink set where a weight concentration of a hydrogen abstraction type photopolymerization initiator for active energy rays having a molar absorption coefficient of 10,000 (l/mol·cm) or more and contained in a yellow ink is 0% to 80% of a weight concentration of a hydrogen abstraction type photopolymerization initiator for active energy rays having a molar absorption coefficient as measured at 365 nm of 10,000 (l/mol·cm) or more and contained in a black ink and a cyan ink, light energy can be sufficiently imparted to a black color portion, and thereby excellent curability is obtained in a multicolor overprinted portion.

As a yellow pigment, a magenta pigment and a cyan pigment used in a yellow ink, a magenta ink and a cyan ink which are used in a multicolor set of active energy ray-curable inks of the invention, pigments shown below are preferred.

As a yellow pigment contained in a yellow ink, a yellow pigment where the relative intensity (absorbance A/absorbance B) of absorbance A as measured at a wavelength of 365 nm and absorbance B as measured at a wavelength 430 nm of an absorption spectrum of a solution obtained by dissolving the pigment in N,N-dimethylformamide is 0.50 or less is preferred. Examples of pigments having such preferable characteristics include, for example, C.I. Pigment Yellow 74, C.I. Pigment Yellow 12, C.I. Pigment Yellow 13, C.I. Pigment Yellow 83 and C.I. Pigment Yellow 176.

In particular, among the above-cited pigments, a yellow pigment where the relative intensity (absorbance B/absorbance A) of absorbance A as measured at a wavelength of 430 nm and absorbance B as measured at a wavelength 365 nm of an absorption spectrum of a solution obtained by dissolving the pigment in N,N-dimethylformamide is 0.30 or less is preferred. Examples of preferable pigments include C.I. Pigment Yellow 74 and C.I. Pigment Yellow 83. More preferably, C.I. Pigment Yellow 74 is preferred from the viewpoint of hue as process color yellow in the printing.

The absorbance is an amount representing a degree at which a certain material layer absorbs light. When an intensity $I_0$ of light having a wavelength of λ nm decreases to I by absorption during passing through a material layer having a thickness of d, as a material concentration of a material layer being assigned as c and an absorption coefficient (proportional constant) intrinsic to a material at a wavelength of λ nm being assigned as $\epsilon$, absorbance at a wavelength of λnm is calculated by the numerical formula:

$$\text{Absorbance} = \log_{10}(I_0/I) = \epsilon c d$$

based on Lambert-Beer Law. The Law holds when a concentration is small and materials do not interact with each other, and the absorbance and relative intensity in the invention are assumed to be within ranges where the Law holds.

On the other hand, the relative intensity in the invention is a ratio of absorbances at two different wavelengths in an absorption spectrum of the same solution. When taking the yellow pigment described above as an example and regarding the absorbance as measured at a wavelength of 365 nm assigned as A, as the absorbance at a wavelength of 430 nm being assigned as B, an absorption coefficient at a wavelength of 365 nm being assigned as $\epsilon_A$ and an absorption coefficient at a wavelength of 365 nm being assigned as $\epsilon_B$, relative intensity (absorbance A/absorbance B) is calculated by the numerical formula:

$$\text{Relative intensity (absorbance } A/\text{absorbance } B) = \epsilon_A/\epsilon_B$$

and becomes a value intrinsic to a material irrespective of a concentration of a material layer and a thickness thereof.

As a magenta pigment contained in a magenta ink, a magenta pigment where relative intensity (absorbance A/absorbance C) of absorbance A as measured at a wavelength of 365 nm to absorbance C as measured at a wavelength 530 nm, which are absorbances of an absorption spectrum of a solution obtained by dissolving the pigment in isopropyl alcohol, is 1.00 or less is preferred. Examples of pigments having such preferable characteristics include, for example, C.I. Pigment Red 53:1, C.I. Pigment Red 57:1, C.I. Pigment Red 48:3, C.I. Pigment Red 48:2, C.I. Pigment Red 48:1, C.I. Pigment Red 185, C.I. Pigment Red 242, and C.I. Pigment Red 243. Among the pigments mentioned above, C.I. Pigment Red 57:1, C.I. Pigment Red 184 and C.I. Pigment Red 185 are particularly preferred from the viewpoint of hue as process color magenta in the printing.

The multicolor set of the invention can include a cyan ink and a black ink other than the yellow ink and magenta ink. Further, a multicolor set may include other colors, as required. In principle, when an ink (such as cyan ink) other than the yellow and magenta inks is used to overprint, it is necessary to the pigment in the ink to keep good balance between coloring power and transmittance at 365 nm like the yellow pigment and magenta pigment. Specific examples of pigments of a cyan ink include phthalocyanine pigments such as copper phthalocyanine blue, halogenated (chlorinated or brominated) copper phthalocyanine blue, sulfonated copper phthalocyanine blue and metal free phthalocyanine; indanthrone pigments; and triphenyl methane pigments. Among the pigments mentioned above, C.I. Pigment Blue 15, that is a phthalocyanine pigment, is preferred from the viewpoint of hue as process color cyan in the printing. Examples of black ink pigment include carbon black and aniline black.

Accordingly, it is particularly preferred that the multicolor ink set of the invention includes a yellow ink, a magenta ink, and a cyan ink, and a yellow pigment that constitutes the yellow ink is at least one kind selected from C.I. Pigment Yellow 74, C.I. Pigment Yellow 12, C.I. Pigment Yellow 13 and C.I. Pigment Yellow 83, a magenta pigment constituting the magenta ink is at least one kind selected from C.I. Pigment Red 57:1, C.I. Pigment Red 184 and C.I. Pigment Red 185, and a cyan pigment constituting a cyan ink is C.I. Pigment Blue 15.

Thus, when pigments having a large light absorption in wavelength regions determining color densities of yellow color, magenta color and cyan color, that is, around 430 nm in the yellow color, around 530 nm in the magenta color and around 620 nm in the cyan color and having a small light absorption at a wavelength of 365 nm are used, an active energy ray-curable ink excellent in the photopolymerizability and internal curability by UV-ray around 365 nm can be obtained. In addition, when this ink is used, an ink having excellent curability in a multiplex overprinted portion by color inks can be obtained. Magnitudes of light absorptions around 430 nm in the yellow pigment, around 530 nm in the magenta pigment and around 620 nm in the cyan pigment are factors for determining a color density, and it is said that the larger the absorption is, the more excellent the coloring power is. By selecting a pigment excellent in the coloring power, an ink film thickness upon printing can be reduced, and by selecting a pigment small in the absorption at 365 nm, a larger amount of light can be imparted to a photopolymerization initiator used for curing an ink. As mentioned above, in a process printing, a multicolor overprinting of inks is usually carried out in an order of a black ink, a cyan ink, a magenta ink and a yellow ink. When pigments having a small absorption at 365 nm, that is, pigments having a large transmittance at 365 nm are used in the cyan, magenta and yellow inks, it is possible to cure sufficient up to a black ink portion, that is, excellent curability can be also obtained upon the multicolor overprinting. Thus, it is necessary to control pigments constituting a yellow ink and a magenta ink, in particular, a yellow ink.

As pigments of other inks, there can be exemplified above-mentioned inorganic pigments and organic pigments. That is, examples of such inorganic pigments include chrome yellow, zinc chrome, iron blue, barium sulfate, cadmium red, titanium oxide, zinc oxide, alumina white, calcium carbonate, ultramarine, graphite, aluminum powder and colcothar. Examples of the organic pigment include various kinds of well known and well used pigments such as: soluble azo pigments such as β-naphthol series, β-oxynaphthoic acid series, β-oxynaphthoic acid based anilide series, acetoacetic acid anilide series, and pyrazolone series; insoluble azo pigments such as monoazo pigment such as β-naphthol series, β-oxynaphthoic acid based anilide series, and acetoacetic acid anilide series, disazo pigments such as acetoacetic acid anilide series, and pyrazolone series; phthalocyanine pigments such as copper phthalocyanine blue, halogenated (chlorinated or brominated) copper phthalocyanine blue, sulfonated copper phthalocyanine blue and metal free phthalocyanine; and polycyclic and heterocyclic pigments such as quinacridone series, dioxazine series, threne series (such as pyranthrone, anthanthrone, indanthrone, anthrapyrimidine, flavanthrone, thioindigo series, anthraquinone series, perynone series and perylene series), isoindolinone series, metal complex series, or quinophthalone series.

EXAMPLES

Hereinafter, the invention will be specifically described with reference to Examples. In Examples, "parts" means "parts by weight" and "%" means "% by weight".

Examples 1 to 5 and Comparative Examples 1 to 2

Ink components were kneaded by a three-roller mill in accordance with constitutions of the respective examples described in Table 1, and thereby, compositions of active energy ray-curable inks of Examples 1 to 5 and Comparative Examples 1 to 2 were obtained. Each of thus-obtained active energy ray-curable ink compositions was printed at 0.2 cc/1000 cm$^2$ on an OK top coat (trade name, basis weight: 57.5 kg/A total, manufactured by Oji Paper Co., Ltd.) by an RI TESTER (trade name, manufactured by Akira Seisakusho), followed by evaluating the "surface Curability" and "Adhesiveness" based on the evaluation methods and evaluation criteria described below. Results are shown in Table 2.

The RI Tester is a test machine for printing an ink on a paper or film and can control an amount of ink transferred and a printing pressure.

<Evaluation of Surface Curability>

A LED-system SPOT type UV irradiation device AICURE with a lamp head ANUJ61524 (trade name, manufactured by Matsushita Electric Works, Ltd.) is used to irradiate UV-rays with a conveyer speed (m/min) varying. The printed surface is touched with a finger and confirmation whether the surface is tacky or not is performed and the fastest conveyer speed free from tackiness is taken as "Surface Curability" (column of "curability" in Table 1).

It is judged that the faster the conveyer speed is, that is, the smaller an amount of light irradiated is, the better the surface curability is.

<Evaluation of Adhesiveness>

In the evaluation of Adhesiveness, the LED-system SPOT type UV irradiation device AICURE with a lamp head ANUJ61524 (manufactured by Matsushita Electric Works, Ltd.) is also used and UV-rays are irradiated from the LED with a conveyer speed (m/min) varying, as same as the evaluation of curability. The adhesiveness is confirmed by the cellophane tape peel test. The fastest conveyer speed, where an ink is completely cured, dried down till a bottom portion and adhered 100%, is taken as curability. When an amount of UV-ray irradiated is insufficient, the ink is not completely cured till a bottom portion and the ink is peeled off at an intermediate layer or bottom portion of an ink film. That is, it is judged that an ink excellent in the adhesiveness is also excellent in the internal curability.

TABLE 1

|  |  | Example 1 | Example 2 | Example 3 | Example 4 | Example 5 | Comparative Example 1 | weight % Comparative Example 2 |
|---|---|---|---|---|---|---|---|---|
| Resin vanish | ① vanish | 40 | 40 | 40 | 40 | 40 | 40 | 40 |
| Compound having | ② KAYARAD DPHA | 15 | 15 | 15 | 15 | 15 | 15 | 15 |
| acrylate group(s) | ③ Laromer LR8863 | 10 | 10 | 10 | 10 | 10 | 10 | 10 |
| Pigment | ④ Lionol Blue FG-7330 | 21 | 21 | 21 | 21 | 21 | 21 | 21 |
| Initiator (A) | ⑤ IRGACURE 379 | 4 |  | 4 | 4 | 4 |  |  |
|  | ⑥ Lucirin TPO |  |  |  |  | 4 |  |  |
| Initiator (B) | ⑦ EAB-SS |  | 4 | 4 | 4 | 4 |  |  |
| Sensitizer (C) | ⑧ KAYACURE EPA |  |  |  | 2 | 2 |  |  |
| Initiator except | ⑨ IRGACURE 184 |  |  |  |  |  | 4 |  |
| (A) and (B) | ⑩ 4MB |  |  |  |  |  |  | 4 |

In Table 1, "varnish" is a varnish produced by charging DAPTOTO DT-170 (trade name, manufactured by Toto Kasei Co., Ltd.)/KAYARAD DPHA (trade name, manufactured by Nippon Kayaku Co., Ltd.)/hydroquinone (manufactured by Seiko Chemical Co., Ltd.) at a ratio of 35/65/0.1, followed by heat-dissolving at 100° C. under air flow.

Further, "KAYARAD DPHA", "Laromer LR8863", "Lionol Blue FG-7330", "IRGACURE 379", "Lucirin TPO", "EAB-SS", "KAYACURE EPA", "IRGACURE 184" and "4 MB" in Table 1 are as shown respectively below.

KAYARAD DPHA: dipentaerythritol hexaacrylate manufactured by Nippon Kayaku Co., Ltd., Laromer LR8863: EO-modified trimethylolpropane tetraacrylate (manufactured by BASF Co., Ltd.), Lionol Blue FG-7330: pigment manufactured by TOYO INK MFG. Co., Ltd., IRGACURE 379: 2-(dimethylamino)-2-[(4-methylphenyl)-methyl]-1-(4-morpholinophenyl)-1-butanone manufactured by CIBA Specialty Chemicals Inc.; molar absorption coefficient at a wavelength of 365 nm: 1130 (l/mol·cm), Lucirin TPO: 2,4,6-trimethylbenzoylphosphine oxide manufactured by BASF Co., Ltd.; molar absorption coefficient at a wavelength of 365 nm: 380 (l/mol·cm), EAB-SS: 4,4'-diethylaminobenzophenone manufactured by Daido Chemical Industry Co., Ltd.; molar absorption coefficient at a wavelength of 365 nm: 43,300 (l/mol·cm), KAYACURE EPA: ethyl p-dimethylaminobenzoate manufactured by Nippon Kayaku Co., Ltd.; molar absorption coefficient at a wavelength of 365 nm: 0 (l/mol·cm), IRGACURE 184: 1-hydroxy-cyclohexyl-phenyl ketone manufactured by CIBA Specialty Chemicals Inc.; molar absorption coefficient at a wavelength of 365 nm: 0 (l/mol·cm), and 4 MB: 4-methylbenzophenone manufactured by Takahata Sangyo Co., Ltd.; molar absorption coefficient at a wavelength of 365 nm: 200 (l/mol·cm).

TABLE 2

|  | Example 1 | Example 2 | Example 3 | Example 4 | Example 5 | Comparative Example 1 | Comparative Example 2 |
|---|---|---|---|---|---|---|---|
| Curability (m/min) | 10 | 20 | 40 | 60 | 80 | not more than 5 | not more than 5 |
| Adhesiveness (m/min) | not more than 5 | 5 | 30 | 40 | 50 | not more than 5 | not more than 5 |

Examples 6 to 8 and Comparative Example 3

In accordance with the constitutions of the respective examples described in Table 3, ink components were kneaded by a three-roller mill and, thereby, a cyan ink C1, a black ink B1, yellow inks Y1 to Y4 and magenta inks M1 to M4, which are different in weight concentration of a photopolymerization initiator (B) for active energy ray with a molar absorption coefficient as measured at 365 nm of 10,000 or more were produced. Thus-obtained active energy ray-curable ink compositions were combined as shown in Examples 6 to 8 and Comparative Example 3 of Table 4, and prints were prepared by printing on an OK top coat (trade name, manufactured by Oji Paper Co., Ltd.) a cyan ink on a black ink, further thereon a magenta ink, still further thereon a yellow ink by an RI tester. The "Surface Curability" and "Adhesiveness" of the prints were evaluated in a manner similar to Examples 1 to 5 and Comparative Example 1. Results are shown in Table 4.

Example 3. Namely, inks of the present invention exhibit more excellent internal curability to UV-rays irradiated by a light-emitting diode generating UV-rays in the range of 350 to 420 nm.

TABLE 3 weight %

| | | Sample No. | | | | | | | | |
|---|---|---|---|---|---|---|---|---|---|---|
| | | C1 | B1 | Y1 | Y2 | Y3 | Y4 | M1 | M2 | M3 | M4 |
| | | Color | | | | | | | | |
| | | Cyan | Black | Yellow | | | | Magenta | | | |
| Resin vanish | ① vanish | 40 | 45 | 42 | 42 | 42 | 42 | 40 | 40 | 40 | 40 |
| Compound having | ② KAYARAD DPHA | 14 | 16 | 19 | 17 | 16 | 15 | 19 | 17 | 16 | 15 |
| acrylate group(s) | ③ Laromer LR8863 | 12 | 12 | 14 | 14 | 14 | 14 | 13 | 13 | 13 | 13 |
| Yellow pigment | ④ Lionol Yellow 1314 | | | 18 | 18 | 18 | 18 | | | | |
| Magenta pigment | ⑤ No. 7003 CARMINE 6B | | | | | | | 21 | 21 | 21 | 21 |
| Cyan pigment | ⑥ Lionol Blue FG-7330 | 21 | | | | | | | | | |
| Black pigment | ⑦ Mitsubishi Carbon MA-77 | | 16 | | | | | | | | |
| Photoinitiator | ⑧ IRGACURE 379 | 3 | 3 | 3 | 3 | 3 | 3 | 3 | 3 | 3 | 3 |
| and | ⑨ Lucirin TPO | 4 | 4 | 4 | 4 | 4 | 4 | 4 | 4 | 4 | 4 |
| photosensitizer | ⑩ EAB-SS | 4 | 4 | 0 | 2 | 3 | 4 | 0 | 2 | 3 | 4 |

In Table 3, "Varnish", "KAYARAD DPHA", "Laromer LR8863", "IRGACURE 379", "Lucirin TPO", and "EAB-SS" are same as those described in Table 1, and "Lionol Yellow 1314", "No. 7003 CARMINE 6B", "Lionol Blue FG-7330", and "Mitsubishi Carbon MA-77" are as shown below respectively.

Lionol Yellow 1314: C.I. Pigment Yellow 13 manufactured by TOYO INK MFG. Co., Ltd., No. 7003 CARMINE 6B: C.I. Pigment Red 57:1 manufactured by Daido Kasei Co., Ltd., Lionol Blue FG-7330: Pigment Blue 15:3 manufactured by TOYO INK MFG. Co., Ltd., Mitsubishi Carbon MA-77: Mitsubishi Carbon Black manufactured by Mitsubishi Chemical Co., Ltd.

TABLE 4

| | | Example 6 | Example 7 | Example 8 | Comparative Example 3 |
|---|---|---|---|---|---|
| Black | 0.13 cc/1000 cm² | B1 | B1 | B1 | B1 |
| Cyan | 0.13 cc/1000 cm² | C1 | C1 | C1 | C1 |
| Magenta | 0.15 cc/1000 cm² | M1 | M2 | M3 | M4 |
| Yellow | 0.15 cc/1000 cm² | Y1 | Y2 | Y3 | Y4 |
| Curability (m/min) | | 30 | 80 | 100 | 100 |
| Adhesiveness (m/min) | | 20 | 40 | 30 | not more than 3.9 |

From results of Table 4, it is found that, in overprinting, Examples 6 to 8 are superior in adhesiveness to Comparative Examples 9 to 17 and Comparative Examples 4 to 5

Each of yellow pigments used in Examples and Comparative Examples was dissolved in N,N-dimethylformamide at a weight concentration of $2.5 \times 10^{-3}$ and absorption spectrums thereof were measured by a UV-visible rays spectrophotometer UV-3600 (trade name, manufactured by Shimadzu Corporation) to obtain the relative intensity (absorbance A/absorbance B) of absorbance A as measured at a wavelength of 365 nm and absorbance B as measured at a wavelength of 430 nm. Results are shown in Table 5.

Furthermore, each of magenta pigments used in Examples and Comparative Examples was dissolved in isopropyl alcohol at a weight concentration of $1.0 \times 10^{-2}$, followed by similarly measuring an absorption spectrum thereof with UV-visible spectrophotometer UV-3600 (trade name, manufactured by Shimadzu Corporation), further followed by obtaining the relative intensity (absorbance A/absorbance B) of absorbance A as measured at a wavelength of 365 nm and absorbance C as measured at a wavelength of 430 nm. Results are shown in Table 6.

TABLE 5

| Pigment No. | Trade name | Absorbency A at 365 nm | Absorbency B at 430 nm | Relative strength (Absorbency A/Absorbency B) |
|---|---|---|---|---|
| C. I Pigment Yellow 13 | Lionol Yellow 1314 | 0.1667 | 0.4235 | 0.39 |
| C. I Pigment Yellow 74 | Hansa Brilliant Yellow 5GX03 | 0.5665 | 1.9640 | 0.29 |
| C. I Pigment Yellow 12 | Lionol Yellow 2RN | 0.9637 | 2.4246 | 0.40 |
| C. I Pigment Yellow 83 | Lionol Yellow FG-1842 | 0.3451 | 1.3111 | 0.26 |
| C. I Pigment Yellow 176 | Permanent Yellow GRV80 | 0.1060 | 0.2361 | 0.45 |
| C. I Pigemnt Yellow 17 | Lionol Yellow FGNH | 0.8085 | 1.4105 | 0.57 |

TABLE 6

| Pigment No. | Trade name | Absorbency A at 365 nm | Absorbency C at 530 nm | Relative strength (Absorbency A/Absorbency C) |
|---|---|---|---|---|
| C. I Pigment Red 57:1 | No. 7003 CARMINE 6B | 0.2101 | 0.3052 | 0.69 |
| C. I Pigment Red 185 | Novaperm Carmine HF-4C | 0.9852 | 1.2977 | 0.76 |
| C. I Pigment Red 184 | Permanent Rubin F6B | 0.5231 | 0.5385 | 0.97 |
| C. I Pigment Red 264 | IRGAZINE DPP Rubin TR | 0.2101 | 0.2089 | 1.01 |

In accordance with constitutions of the respective examples described in Table 7, ink components were kneaded by a three-roller mill and thereby active energy ray-curable ink compositions of Examples 9 to 17 and Comparative Examples 4 to 5 were obtained. Each of thus-obtained active energy ray-curable ink compositions was evaluated about "Color Density", "Surface Curability" and "Adhesiveness" in the case of monochrome printing and "Curability" and "Adhesiveness" in the case of overprinting.

In the case of evaluation of monochrome printing, each of the inks shown in Examples 9 to 17 and Comparative Examples 4 to 5 was printed at an amount of 0.2 cc/1000 cm$^2$ on an OK top coat (trade name, manufactured by Oji Paper Co., Ltd.) by an RI tester. Results are shown in Table 8.

The "Surface Curability" and "Adhesiveness" thereof were evaluated according to the evaluation criteria same as those of Examples 1 to 5 and Comparative Example 1. The "Color Density" was evaluated based on an evaluation method shown below.

<Evaluation of Color Density>

"Color Density" was measured with Gretag-Macbeth densitometer D196 (trade name, manufactured by Gretag-Macbeth Co., Ltd.).

In Table 7, "Varnish", "KAYARAD DPHA", "Laromer LR8863", "Lionol Yellow 1314", "No. 7003 CARMINE 6B", "Lionol Blue FG-7330", "IRGACURE 379", "Lucirin TPO" and "EAB-SS" are same as those described in Tables 1 and 3, and "Hansa Brilliant Yellow 5GX G3", "Permanent Yellow GRV80", "Lionol Yellow 2RN", "Lionol Yellow FG-1842", "Lionol Yellow 1703", "Novaperm Carmine HF-4C", "Permanent Rubine F6B" and "IRGAZIN DPP Rubine TR" respectively are as shown below.

Hansa Brilliant Yellow 5GX G3: C.I. Pigment Yellow 74 manufactured by Clariant Co., Ltd., Permanent Yellow GRV80: C.I. Pigment Yellow 176 manufactured by Clariant Co., Ltd., Lionol Yellow 2RN: C.I. Pigment Yellow 12 manufactured by Toyo Ink MFG. Co., Ltd., Lionol Yellow FG-1842: C.I. Pigment Yellow 83 manufactured by Toyo Ink MFG. Co., Ltd.,

TABLE 7

| | | Example 9 Yellow | Example 10 Yellow | Example 11 Yellow | Example 12 Yellow | Example 13 Yellow | Example 14 Magenta | Example 15 Magenta | Example 16 Magenta | Example 17 Cyan | Comparative Example 4 Yellow | weight % Comparative Example 5 Magenta |
|---|---|---|---|---|---|---|---|---|---|---|---|---|
| Resin vanish | ① vanish | 45 | 45 | 45 | 45 | 45 | 42 | 42 | 42 | 40 | 45 | 42 |
| Compound having acrylate group(s) | ② KAYARAD DPHA | 15 | 15 | 15 | 15 | 15 | 14 | 14 | 14 | 15 | 15 | 14 |
| | ③ Laromer LR8863 | 14 | 14 | 14 | 14 | 14 | 15 | 15 | 15 | 14 | 12 | 15 |
| Yellow pigment | ④ Hansa Brilliant Yellow 5GX 03 | 18 | | | | | | | | | | |
| | ⑤ Lionol Yellow 1314 | | 18 | | | | | | | | | |
| | ⑥ Permanent Yellow GRV80 | | | 18 | | | | | | | | |
| | ⑦ Lionol Yellow 2RN | | | | 18 | | | | | | | |
| | ⑧ Lionol Yellow FG-1842 | | | | | 18 | | | | | | |
| | ⑨ Lionol Yellow 1703 | | | | | | | | | | 18 | |
| Magenta pigment | ⑩ No. 7003 CARMINE 6B | | | | | | 21 | | | | | |
| | ⑪ Novaperm Carmine HF-4C | | | | | | | 21 | | | | |
| | ⑫ Permanent Rubin F6B | | | | | | | | 21 | | | |
| | ⑬ IRGAZIN DPP Rubine TR | | | | | | | | | | | 21 |
| Cyan pigment | ⑭ Lionol Blue FG-7330 | | | | | | | | | 21 | | |
| Photoinitiator and photosensitizer | ⑮ IRGACURE 379 | 2 | 2 | 2 | 2 | 2 | 2 | 2 | 2 | 4 | 2 | 2 |
| | ⑯ Lucirin TPO | 4 | 4 | 4 | 4 | 4 | 4 | 4 | 4 | 4 | 4 | 4 |
| | ⑰ EAB-SS | 2 | 2 | 2 | 2 | 2 | 2 | 2 | 2 | 2 | 2 | 2 |

Lionol Yellow 1703: C.I. Pigment Yellow 17 manufactured by Toyo Ink MFG. Co., Ltd., Novaperm Carmine HF-4C: C.I. Pigment Red 185 manufactured by Clariant Co., Ltd., Permanent Rubine F6B: C.I. Pigment Red 184 manufactured by Clariant Co., Ltd., IRGAZIN DPP RUBINE TR: C.I. Pigment Red 264 manufactured by Ciba Specialty Chemicals In the invention, offset printing was described as a representative example. However, the invention can be broadly applied to printing methods such as other lithographic printing methods, letterpress printing methods such as flexographic printing method, intaglio printing methods such as a gravure printing method, stencil printing methods such as a silk screen printing method and an inkjet printing method, where multi-color inks are overprinted and collectively cured.

TABLE 8

Evluation by single color

| | Present invention | | | | | | | | | Comparative Example | |
|---|---|---|---|---|---|---|---|---|---|---|---|
| | Example 9 | Example 10 | Example 11 | Example 12 | Example 13 | Example 14 | Example 15 | Example 16 | Example 17 | Comparative Example 4 | Comparative Example 5 |
| Yellow color density | 1.85 | 1.81 | 1.75 | 1.79 | 1.82 | — | — | — | — | 1.64 | — |
| Magenta color density | — | — | — | — | — | 2.13 | 1.95 | 2.01 | — | — | 1.93 |
| Cyan color density | — | — | — | — | — | — | — | — | 2.65 | — | — |
| Curability (m/min) | 120 | 70 | 60 | 70 | 140 | 150 | 120 | 120 | 50 | 30 | 110 |
| Adhesiveness (m/min) | 100 | 60 | 50 | 50 | 120 | 140 | 100 | 80 | 20 | 20 | 60 |

Example 18

Evaluations in the case of overprinting were performed using inks obtained in Examples 9 to 17 and Comparative Examples 4 to 5. Inks of the respective colors were combined and used as shown in multicolor sets 1 to 12 described in Table 9, and printed matters were prepared by printing a magenta ink over a cyan ink, a yellow ink over a cyan ink or a magenta ink over a cyan ink, and further a yellow ink thereon on OK top coat papers (manufactured by Oji Paper Co., Ltd.) by an RI tester. The printed matters were evaluated about "Surface Curability" and "Adhesiveness" in a manner similar to Examples 1 to 5 and Comparative Examples 1 to 2. Results thereof are shown in Table 9.

The invention claimed is:

1. An active energy ray-curable ink comprising a photo-cleavage type photopolymerization initiator (A) comprising
   an α-aminoalkylphenone compound (A1) having a molar absorption coefficient as measured at a wavelength of 365 nm of 100 (l/mol·cm) or more and less than 100,000 (l/mol·cm) and/or an acylphosphine oxide compound (A2) having a molar absorption coefficient as measured at a wavelength of 365 nm of 100 (l/mol·cm) or more and less than 100,000 (l/mol·cm);
   a hydrogen abstraction type photopolymerization initiator (B) comprising 4,4'-dialkylaminobenzophenone having a molar absorption coefficient as measured at a wave-

TABLE 9

Evaluation by a set of multi colours

| | | Present invention | | | | | | | | | Comparative Example | | |
|---|---|---|---|---|---|---|---|---|---|---|---|---|---|
| | | Set 1 of multi colours | Set 2 of multi colours | Set 3 of multi colours | Set 4 of multi colours | Set 5 of multi colours | Set 6 of multi colours | Set 7 of multi colours | Set 8 of multi colours | Set 9 of multi colours | Set 10 of multi colours | Set 11 of multi colours | Set 12 of multi colours |
| Cyan | 0.13 cc/1000 cm² | Example 17 | Example 17 | Example 17 | Example 17 | Example 17 | Example 17 | Example 17 | Example 17 | Example 17 | Example 17 | Example 17 | Example 17 |
| Magenta | 0.2 cc/1000 cm² | — | — | — | — | — | Example 14 | Example 15 | Example 16 | Example 17 | — | Comparative Example 5 | Comparative Example 5 |
| Yellow | 0.2 cc/1000 cm² | Example 9 | Example 10 | Example 11 | Example 12 | Example 13 | — | — | — | Example 14 | Comparative Example 4 | — | Comparative Example 4 |
| Curability (m/min) | | 120 | 70 | 60 | 70 | 140 | 150 | 120 | 120 | 100 | 30 | 110 | 20 |
| Adhesiveness (m/min) | | 60 | 30 | 20 | 30 | 70 | 80 | 60 | 60 | 40 | not more than 3.9 | 50 | not more than 3.9 |

From results of Tables 8 and 9, in monochrome printings of Examples 9 to 17 and a overprinting of Example 18, inks of the present invention exhibit superior curability to UV-rays irradiated from a light-emitting diode generating UV-rays in the range of 350 to 420 nm compared with Comparative Examples.

length of 365 nm of 10,000 (l/mol·cm) or more and less than 1,000,000 (l/mol·cm); and a tertiary amine compound (C) having a molar absorption coefficient as measured at a wavelength of 365 nm of 1 (l/mol·cm) or less.

2. The active energy ray-curable ink according to claim 1, wherein the α-aminoalkylphenone compound (A1) having a molar absorption coefficient as measured at a wavelength of 365 nm of 100 (l/mol·cm) or more and less than 100,000 (l/mol·cm) is 2-benzyl-2-dimethylamino-1-(4-morpholinophenyl)butan-1-one or 2-(dimethylamino)-2-[(4-methylphenyl)methyl]-1-(4-morpholino-phenyl)butan-1-one.

3. The active energy ray-curable ink according to claim 1, wherein the acylphosphine oxide compound (A2) having a molar absorption coefficient as measured at a wavelength of 365 nm of 100 (l/mol·cm) or more and less than 100,000 (l/mol·cm) is 2,4,6-trimethylbenzoyl-diphenyl-phosphine oxide or bis(2,4,6-trimethylbenzoyl)phenylphosphine oxide.

4. The active energy ray-curable ink according to claim 1, wherein the tertiary amine compound (C) having a molar absorption coefficient as measured at a wavelength of 365 nm of 1 (l/mol·cm) or less is an aromatic tertiary amine compound.

5. The active energy ray-curable ink according to claim 4, wherein the aromatic tertiary amine compound (C) is ethyl p-dimethylaminobenzoate.

6. The active energy ray-curable ink according to claim 1, wherein the active energy ray-curable ink further comprises a pigment, a resin, and an acrylic group-containing compound.

7. The active energy ray-curable ink according to claim 1, wherein the active energy ray-curable ink is an ink for use in a lithographic printing, a letter press printing, an intaglio printing, or a stencil printing.

8. A multicolor set of active energy ray-curable inks comprising that:
each of the active energy ray-curable inks of the multicolor set is made of the active energy ray-curable ink according to claim 1, and a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in an active energy ray-curable ink disposed on a closest side to an active energy ray irradiation source when multicolor-printed is 0% to 80% of a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in an active energy ray-curable ink disposed on a farthest side to an active energy ray irradiation source.

9. The multicolor set of active energy ray-curable inks according to claim 8, wherein the multicolor set comprising the active energy ray-curable inks include at least a yellow ink, a magenta ink, a cyan ink, and a black ink.

10. The multicolor set of the active energy ray-curable inks according to claim 9, wherein a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm), which is contained in a yellow ink is 0% to 80% of a larger one of weight concentrations of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm) contained in a black ink and a cyan ink.

11. The multicolor set of active energy ray-curable inks according to claim 9, wherein a weight concentration of a hydrogen abstraction type photopolymerization initiator (B) comprising 4,4'-dialkylaminobenzophenone having a molar absorption coefficient as measured at 365 nm of 10,000 (l/mol·cm) or more and less than 1,000,000 (l/mol·cm) contained in a black ink and a magenta ink is from 0.5% to 5%.

12. The multicolor set of active energy ray-curable inks according to claim 9, wherein a yellow pigment contained in the yellow ink has a relative intensity (absorbance A/absorbance B) of absorbance A as measured at a wavelength of 365 nm to absorbance B as measured at a wavelength 430 nm, which are absorbances obtained from an absorption spectrum of a solution obtained by dissolving the yellow pigment in N,N-dimethylformamide, is 0.50 or less.

13. The multicolor set of active energy ray-curable inks according to claim 12, wherein the yellow pigment is at least one selected from C. I. Pigment Yellow 74, C. I. Pigment Yellow 12, C. I. Pigment Yellow 13, and C.I. Pigment Yellow 83.

14. The multicolor set of active energy ray-curable inks according to claim 9, wherein a magenta pigment contained in the magenta ink has a relative intensity (absorbance A/absorbance C) of absorbance A as measured at a wavelength of 365 nm to absorbance C as measured at a wavelength 530 nm, which are absorbances obtained from an absorption spectrum of a solution obtained by dissolving the magenta pigment in isopropyl alcohol, is 1.00 or less.

15. The multicolor set of active energy ray-curable inks according to claim 14, wherein the magenta pigment is at least one selected from C.I. Pigment Red 57:1, C.I. Pigment Red 184, and C.I. Pigment Red 185.

16. The multicolor set of active energy ray-curable inks according to claim 9, wherein a cyan pigment constituting the cyan ink is Pigment Blue 15.

17. A method for producing an ink cured matter comprising:
printing with inks of the multicolor set described in any one of claims 8 to 16; and
curing printed inks with a light-emitting diode emitting a bright line in the range of from 350 to 420 nm.

18. The method for producing an ink cured matter according to claim 17, wherein the printing is an overprinting and after the overprinting, overprinted inks are collectively cured with a light-emitting diode emitting a bright line in the range of from 350 to 420 nm.

19. A printed matter obtained by the method for producing an ink cured matter according to claim 17.

20. A printed matter obtained by the method for producing an ink cured matter according to claim 18.

* * * * *